US011968311B2

(12) United States Patent
Sadoghi Hamedani et al.

(10) Patent No.: US 11,968,311 B2
(45) Date of Patent: Apr. 23, 2024

(54) MULTI-SHARD TRANSACTIONS IN A BYZANTINE COMPUTING ENVIRONMENT

(71) Applicant: The Regents of the University of California, Oakland, CA (US)

(72) Inventors: Mohammad Sadoghi Hamedani, Davis, CA (US); Jelle Antonius Johannes Hellings, Hamilton (CA); Suyash Gupta, Fremont, CA (US); Sajjad Rahnama, Davis, CA (US)

(73) Assignee: The Regents of the University of California, Oakland, CA (US)

(*) Notice: Subject to any disclaimer, the term of this patent is extended or adjusted under 35 U.S.C. 154(b) by 331 days.

(21) Appl. No.: 17/516,074

(22) Filed: Nov. 1, 2021

(65) Prior Publication Data

US 2023/0019637 A1    Jan. 19, 2023

Related U.S. Application Data

(60) Provisional application No. 63/231,523, filed on Aug. 10, 2021, provisional application No. 63/224,329, (Continued)

(51) Int. Cl.
*H04L 9/32* (2006.01)
*H04L 67/1095* (2022.01)
(Continued)

(52) U.S. Cl.
CPC .......... *H04L 9/3247* (2013.01); *H04L 9/3236* (2013.01); *H04L 67/1095* (2013.01); *H04L 67/1097* (2013.01); *H04L 9/50* (2022.05)

(58) Field of Classification Search
CPC . H04L 9/3247; H04L 9/3236; H04L 67/1097; H04L 9/50
See application file for complete search history.

(56) References Cited

U.S. PATENT DOCUMENTS

| | | | |
|---|---|---|---|
| 2015/0317349 A1* | 11/2015 | Chao | G06F 16/278 707/615 |
| 2017/0236120 A1* | 8/2017 | Herlihy | G06Q 20/065 705/67 |
| 2021/0234665 A1* | 7/2021 | Kramer | G06F 16/278 |

OTHER PUBLICATIONS

Al-Bassam, Mustafa, "Chainspace: A Sharded Smart Contracts Platform", arXiv:1906.05552v3 [cs.DC] Jan. 22, 2021.
(Continued)

*Primary Examiner* — Anh Nguyen
(74) *Attorney, Agent, or Firm* — Park, Vaughan, Fleming & Dowler LLP

(57) ABSTRACT

In a Byzantine computing environment in which a database is sharded or partitioned among multiple clusters of computing nodes, consensus for and execution of data transactions (e.g., transactions that require and/or affect data of one or more shards) are achieved in a resilient manner. Within some clusters, multiple primary replicas concurrently propose transactions for processing in parallel by all replicas. For some multi-shard transactions, shards involved in the transactions may be logically ring-ordered; each shard in turn achieves consensus among its nodes to commit the transactions, and then executes its portion of the operation after consensus is obtained among all shards. For some other multi-shard transactions, involved shards first determine whether local data constraints are satisfied, after which data modifications are made in parallel.

21 Claims, 7 Drawing Sheets

Related U.S. Application Data filed on Jul. 21, 2021, provisional application No. 63/222,657, filed on Jul. 16, 2021.

(51) Int. Cl.
*H04L 67/1097* (2022.01)
*H04L 9/00* (2022.01)

(56) References Cited

OTHER PUBLICATIONS

Amiri, Mohammad Javad, "SharPer: Sharding Permissioned Blockchains Over Network Clusters", arXiv:1910.00765v2 [cs.DB] Feb. 16, 2020.
Dang, Hung, "Towards Scaling Blockchain Systems via Sharding", 2019 Association for Computing Machinery, SIGMOD '19, Jun. 30-Jul. 5, 2019, Amsterdam, Netherlands.
Gueta, Guy Golan, "SBFT: A Scalable and Decentralized Trust Infrastructure", arXiv:1804.01626v3 [cs.DC] Jan. 2, 2019.
Hellings, Jelle, "CERBERUS: Minimalistic Multi-shard Byzantine-resilient Transaction Processing", https://arxiv.org/abs/2008.04450v110 [cs.DC] Aug. 2020.
Stathakopoulou, Chrysoula, "Mir-BFT: High-Throughput Robust BFT for Decentralized Networks", arXiv:1906.05552v3 [cs.DC] Jan. 22, 2021.
Wang, G et al., "SoK:Sharding on Blockchain", Proceedings of the 1st ACM Conference on Advances in Financial Technologies, Oct. 2019, pp. 41-61.

\* cited by examiner

MULTI-SHARD TRANSACTIONS IN A BYZANTINE COMPUTING ENVIRONMENT

RELATED APPLICATION(S)

This application claims priority to U.S. Provisional Patent Applications 63/222,657 (filed Jul. 16, 2021); 63/224,329 (filed Jul. 21, 2021); and 63/231,523 (filed Aug. 10, 2021). The preceding provisional patent applications are incorporated herein by reference.

BACKGROUND

This disclosure relates to the field of distributed computing. More particularly, systems and methods are provided for recording a transaction within a resilient sharded data management system in a Byzantine computing environment.

Distributed ledger data systems such as blockchains provide ordered histories of transactions in the form of linked blocks. Each block memorializes one or more transactions in a manner that makes each recorded transaction secure, immutable, and non-repudiable, and a transaction is added to a block only after being authenticated. Blocks of transactions are cryptographically linked to form a chain, making it is extremely difficult to replace an existing block or alter a transaction recorded within a block.

Distributed ledger systems are often implemented within what is termed a Byzantine computing environment. In this type of environment, a malicious participant may attempt to prevent a particular client entity from accessing the distributed data, prevent initiation or completion of some transactions (e.g., transactions of a particular client entity), and/or cause inconsistency or disruption within the distributed data. A faulty but not necessarily malicious participant may also impede the processing of transactions.

Data may be replicated to enhance system integrity and resiliency, but complexity may increase commensurately in order to keep all replicas current. In addition, full replication of a set of data may provide significant resiliency but will be difficult to scale as the amount of stored data grows. Introducing sharding to the environment may support scalability, but existing sharding solutions generally fail to provide data validity guarantees that comply with the ACID (Atomicity, Consistency, Isolation, Durability) properties. In addition, existing resilient sharded systems tend to be optimized for transactions that involve only a single shard or transactions that do not involve resource contention.

However, today's large distributed environments often feature tens or hundreds of shards, with each shard containing any number of replicas of the shard's data. Coordinating a data transaction across multiple shards while ensuring data integrity can therefore present significant challenges. For example, in a multi-shard transaction, not only must a given shard be able to concurrently process its portion of multiple transactions so as to promote efficient throughput, but conflicts between shards must be minimized and deadlock must be prevented. Also, to maintain Byzantine fault tolerance, transactions must be ordered identically across all shards and across all replicas within each shard. Traditional solutions for executing data transactions in a Byzantine computing environment generally suffer from low throughput and/or high latency when applied to multi-shard transactions, and/or do not scale well as the transaction load increases.

Further, existing protocols for achieving consensus among multiple replicas of one set of data (e.g., replicas of one shard within a sharded environment) often require a primary replica to be the only replica that can propose a new transaction, which it does by broadcasting the transaction to other replicas. The other replicas then exchange state information to determine whether the transaction is valid. Because all transactions must be initiated by the primary replica, transaction throughput among the replicas is limited by the primary replica's transmission bandwidth; in addition, other replicas' bandwidth is underutilized.

SUMMARY

In some embodiments, systems and methods are provided for supporting and executing single-shard and/or multi-shard data transactions in a Byzantine fault-tolerant computing environment. In these embodiments, the computing environment hosts a federated database maintained by multiple parties, thereby requiring resilient consensus regarding some or all transactions. The federated database may comprise a distributed ledger or blockchain.

While facilitating completion of a transaction, embodiments described herein resist attempts by bad actors to compromise the transaction or affect an entity's ability to participate in the transaction, and also protect against non-malicious activity caused by a faulty node or an unreliable network.

In some embodiments, shards of a multi-shard environment are logically ring-ordered by unique identifiers. A multi- (or cross-) shard transaction proceeds through the shards in their logical order. Thus, the nodes (e.g., replicas) of a first or initial shard in a set of shards involved in a particular multi-shard transaction arrive at a consensus to commit the transaction before forwarding the transaction to the shard that is next in order. As each shard commits to the transaction it locks the local data needed to execute the transaction. After all shards commit to the transaction, another ordered traversal of the involved shards is conducted to complete execution of the transaction and report to the client that submitted the transaction. Virtually any consensus protocol may be employed among the replicas of a given shard.

In some other embodiments, a framework is provided for supporting some or all ACID (Atomicity, Consistency, Isolation, Durability) properties during the execution of multi-shard transactions. Benefits include high transaction throughput and high scalability without the increased latency often imposed by existing systems.

The framework provides multiple schemes for replicating and executing a transaction among all shards involved in the transaction, including linear, centralized, and distributed orchestration. Linear orchestration minimizes the overall number of consensus and cluster-sending steps necessary to reach an agreement decision, at the cost of latency. Distributed orchestration and centralized orchestration both minimize the latency necessary to reach an agreement decision by reaching such decisions in at-most three or four consecutive consensus steps, respectively, at the cost of additional consensus and cluster-sending steps. In some implementations, commit and abort votes may require only a single consensus step per involved shard. Virtually any consensus protocol may be employed among the replicas of a given shard.

Orchestration of a transaction may feature two-phased commitment of the transaction, and execution of the transaction may employ a form of two-phase locking that involves minimal cost in terms of coordination or communication among shards. For example, certain Byzantine primitives may be used to provide blocking locks that can be processed without any additional consensus steps for the involved shards. These primitives also support non-blocking locks. Based on these primitives, read uncommitted, read committed, and serializable execution of transactions can be supported. Furthermore, isolation-free execution is also provided.

In some embodiments, concurrent consensus is provided so that, instead of employing a single primary replica to manage all transactions within a given data shard or cluster of replicas, and thereby being vulnerable to a single point of failure, multiple replicas can act as concurrent primaries such that each of them can propose transactions. Each replica broadcasts a proposed transaction (or a set of proposed transactions) to all other replicas, which occurs within a logical "consensus instance" corresponding to or associated with the replica. Multiple transactions may be in flight at any given time among the replicas, wherein each one belongs to a separate consensus instance managed by a corresponding replica.

In some further embodiments, instead of one replica being permanently associated with a consensus instance and therefore always acting as the primary replica for that instance, the role of primary replica for each consensus instance may rotate among the replicas. For example, during each round, each replica may act as primary for a different instance, and during the next round, some or all associations may change such that some or all consensus instances have a different associated primary replica. In these embodiments, failure of a given replica or malicious behavior of a given replica may be easier to detect and also have less impact because transactions affected by the failed or malicious node within a particular instance can be recovered when a different replica becomes primary of that instance. Embodiments of concurrent consensus may be implemented within shards that implement embodiments of facilitating multi-shard transactions as described herein.

DETAILED DESCRIPTION

Figure 1:
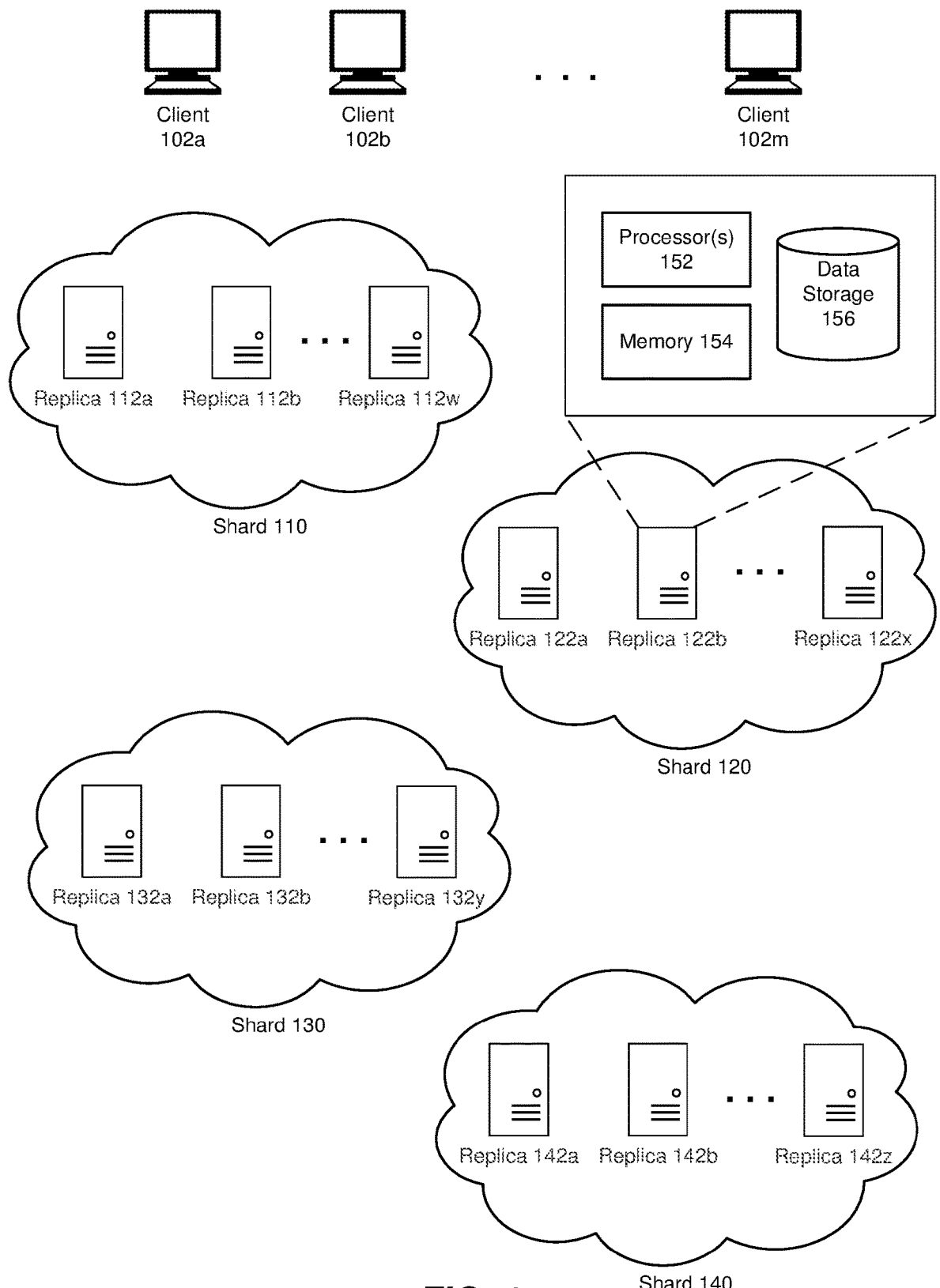
FIG. 1 is a block diagram depicting a computing environment in which multi-shard transactions are recorded in a federated database, in accordance with some embodiments.

The following description is presented to enable any person skilled in the art to make and use the disclosed embodiments, and is provided in the context of one or more particular applications and their requirements. Various modifications to the disclosed embodiments will be readily apparent to those skilled in the art, and the general principles defined herein may be applied to other embodiments and applications without departing from the scope of those that are disclosed. Thus, the present invention or inventions are not intended to be limited to the embodiments shown, but rather are to be accorded the widest scope consistent with the disclosure.

Introduction

In some embodiments, systems and methods are provided for adding transactions to a distributed ledger (e.g., a blockchain) distributed across multiple shards or clusters. More particularly, in these embodiments the database or data management system that comprises the distributed ledger is divided or partitioned into multiple shards (or clusters), and each shard includes multiple replicas of the shard's data.

Although a given transaction may require access to and processing by a single shard or, more specifically, by the replicas within a single shard, at least some transactions require access to and processing by replicas within multiple shards. Finalizing and recording a transaction within the distributed ledger requires all involved shards, and all replicas within each involved shard, to agree on the transaction, or else the transaction is aborted. The terms 'database,' 'federated database,' 'distributed database,' 'data management system,' 'distributed ledger,' and 'blockchain' may be used interchangeably to refer to a distributed collection of recorded transactions stored in these environments.

In some embodiments, database shards are ordered in a logical ring or circle. When a new multi-shard transaction is received that involves activity by multiple (or all) shards, the process of achieving consensus to commit, lock, and execute the transaction proceeds linearly in ring order, and may involve multiple (e.g., two, three) traversals of the ring or circle. Only after consensus is achieved among each involved shard's replicas is the transaction executed, recorded in a block and added to the database. Within a given shard, virtually any consensus protocol may be employed to coordinate action among the shard's replicas.

In some other embodiments, shards need not all be ordered (although some with particular roles may be ordered) and only a single pass through the involved shards is necessary to commit, lock, and execute the transaction. In these embodiments, every shard implements an orchestrate-execute model (OEM) to first orchestrate a transaction by replicating it among involved shards and determining whether it can be committed (e.g., by testing data constraints levied by the transaction), and then executing the transaction by applying data modifications specified by the transaction. Within a given shard, virtually any consensus protocol may be employed to coordinate action among the shard's replicas.

In yet other embodiments, consensus among the replicas of a given shard (e.g., to commit a transaction) is obtained without reliance upon a single primary. In particular, some or all of the replicas (i.e., at least two) act as concurrent primaries and independently propose transactions, thereby yielding concurrent consensus. Each such replica broadcasts a proposed transaction (or a set of proposed transactions) to all other replicas within a logical "consensus instance" corresponding to or associated with the replica. Multiple transactions may be in flight at any given time within the shard, wherein each one belongs to a separate consensus instance managed by a corresponding replica. Use of a disclosed concurrent consensus scheme described herein, in a Byzantine environment, may be referred to as resilient concurrent consensus or RCC.

Multiple embodiments described herein may be implemented simultaneously. For example, for different multi-shard transactions, different OEMs may be implemented among the involved shards, even if the transactions are processed in parallel. As another example, concurrent consensus may be implemented within one or more shards that participate in a multi-shard transaction using an OEM or a ring-ordered topology.

FIG. 1 is a block diagram depicting a computing environment in which single-shard and/or multi-shard transactions are executed and recorded in a federated database, according to some embodiments.

In these embodiments, the federated database is distributed or partitioned into a set of shards denoted S, wherein $S=\{S_1, S_2, \ldots, S_n\}$, $n=|S|$, and each shard $S_i$ contains a set of data exclusive of other shards' data. Although only four shards (shards 110, 120, 130, 140) are illustrated in FIG. 1, in other embodiments any number of shards (e.g., tens or hundreds) may be employed.

Transactions are initiated by clients 102 (e.g., clients 102a-102m), and each transaction may involve any or all (i.e., one or more) of the database shards. The number of shards involved in a given transaction (the 'involved' shards) is often less than $|S|$ and the subset of the shards of S that are involved may be denoted T, wherein $T \subseteq S$ and $|T| \geq 1$. For a single-shard transaction $|T|=1$, while for a multi-shard transaction $|T|>1$. A shard is considered 'involved' in a transaction if data must be read from and/or written to the shard's set of data during the transaction.

Each shard comprises multiple replicas (or nodes), and each replica or node comprises a computing machine (e.g., a data server) having one or more associated data storage devices that store one or more copies of the set of data apportioned to the replica's shard. Thus, shard 110 includes replicas 112a-112w, shard 120 features replicas 122a-122x, shard 130 comprises replicas 132a-132y, and shard 140 comprises replicas 142a-142z. Different shards may have different numbers of replicas, which may be numbered in the tens or hundreds in some implementations, but in some embodiments every shard features the same number (or almost the same number) of replicas. The set of replicas of a given shard $S_i$ may be denoted $R_i$.

The composition of an illustrative replica (replica 122b) is shown in FIG. 1, and includes one or more processors 152, memory 154, and data storage 156. Data storage 156 stores a copy of the portion of the database stored within shard 120, and may include one or more devices that may have solid-state, magnetic, optical, and/or other types of media for storing data. Data storage 156 and/or memory 154 store program code, for execution by processors 152, to perform or facilitate embodiments described herein.

The computing environment of FIG. 1 may be Byzantine, meaning that one or more replicas in one or more shards may be faulty or may act maliciously. In this case, accurate mining or completion of transactions among the system's shards will be guaranteed as long as, for every shard $S_i$, $|R_i| \geq 3f_i+1$, wherein $f_i$ represents the number of faulty and/or malicious nodes/replicas within $S_i$. Thus, in some embodiments, integrity of the database may require the number of byzantine replicas (i.e., faulty and/or malicious nodes) in each shard to be less than one-third the total number of replicas within the shard.

Non-byzantine nodes are assumed to behave correctly and deterministically apply the local consensus protocol within the shard (e.g., RCC, Practical Byzantine Fault Tolerance (PBFT)). That is, given identical inputs, non-byzantine replicas must produce identical outputs. It may be noted that $|R_i|=f_i+nf_i$, wherein $nf_i$ represents the number of non-faulty (or non-byzantine) replicas within $S_i$.

Different replicas within a shard may be maintained by different organizations and therefore operate somewhat independently of other replicas but, as described herein, some or all of the shard's replicas must cooperate to achieve consensus regarding a transaction that involves the shard's data before that transaction can be executed and recorded in the database.

As will be seen in the following sections, embodiments described herein satisfy essential requirements for a secure and trustworthy record of transactions. Those requirements include resiliency (the system can continue operation without interruption despite malicious behavior and/or failures by a minority of nodes), ordering (the distributed ledger stores transaction in an ordered manner), and integrity (existing transaction blocks in the ledger are virtually impossible to replace or alter without the support of a majority of the nodes).

Although not shown in FIG. 1, the illustrated computing environment includes communication links that couple each client to at least one replica of one shard, couple each shard's replicas to each other, and couple each replica of a shard to at least one replica of every other shard. Local and/or wide-area networks may be used to communicate between entities depicted in FIG. 1, including private networks (e.g., intranets) and/or public networks such as the Internet. Thus, during the processing of a transaction, a given replica of a given shard may simultaneously and/or successively communicate with any number of replicas of the same shard and/or other shards, and may also communicate with one or more clients.

Ring-Ordered Processing of Multi-Shard Transactions

As introduced above, in some embodiments multiple shards or clusters of a distributed data management system are logically ordered in a ring, and consensus and execution of a transaction is sought by each shard in order of the logical arrangement. The logical position of a given shard $S_i$ within the ring topology comprising n shards may be denoted id($S_i$), wherein $1 \leq id(S_i) \leq n$. Shard identifiers may be deterministic and based on some known identifier(s) or identifying information (e.g., shard identity, network address), or may be random or assigned by a central authority. The order of the shards may change on a periodic, regular, or irregular basis (e.g., by choosing different criteria for the ordering), and may even be arbitrary, as long as all shards agree upon the order.

One shard within the ring is designated the initiator shard, such as the shard having the lowest identifier (if the ring is ordered by increasing identifiers) or the shard having the highest identifier (if the ring is ordered by decreasing identifiers).

In some implementations, multiple flows may co-exist with the same logical ordering, wherein each flow supports or facilitates a different transaction. Each flow may employ the same ring ordering in these implementations, but in some implementations different flows may involve different ring orders. Thus, numerous transactions may be in flight at any given time in different flows. It may be noted that multi-shard transactions that involve only a subset of the system's shards S need only be processed by the involved shards T; that processing will occur in ring order but will bypass uninvolved shards.

Within each shard, consensus among the shard's replicas in these embodiments may be obtained using any suitable protocol that employs a single primary, wherein one of the replicas acts as a coordinator or leader for the purpose of achieving consensus. For example, PBFT, Zyzzyva, SBFT (Simplified Byzantine Fault Tolerance), or PoE (Proof of Execution) may be employed within a given shard.

In some embodiments, a client submits a transaction to the primary node or replica of a shard that is involved in the transaction. In these embodiments, clients are aware of primary replicas of each shard of the distributed database, and are also aware of how the data are partitioned (i.e., which data are stored in which shards). Thus, based on details of the transaction, the client can identify at least one shard that is involved in the transaction and knows the primary replica of that shard (e.g., by network address or other identifier). In some other embodiments, a client may submit a transaction to a coordinator, which may comprise a computer system that dispatches transactions to appropriate shards and replicas. In yet other embodiments, some or all clients are assigned to specific replicas and, by default, submit their transactions to their assigned replicas.

Thus, a transaction initiated by a client enters the system at any replica of any shard, at the primary replica of a shard that will be involved in the transaction, or possibly at a computing device configured to receive and manage client communications. If not received at an appropriate replica, it will be forwarded to a responsible replica.

This replica, and others that process the transaction, can determine whether any work is required in the receiving replica's shard. More particularly, examination of the transaction allows identification of the shards that must process the transaction—i.e., those shards to which data must be written and/or from which data must be read or derived in order to execute the transaction—which may be termed the read/write set for the transaction and which constitute set T of involved shards.

A given transaction t can be represented as $t=(O, M)$, wherein O is a set of data constraints and M is a set of data modifications. In an illustrative environment in which the distributed data comprise financial accounts, each member constraint of O may be represented as $\text{CON}(X, y)$, which means that the balance of account X must be at least y in order for the transaction to proceed. Similarly, each member modification of M may be represented as $\text{MOD}(X, y)$, which means that the value of y (which may be negative or positive) should be added to account X.

In this environment, the constraints and modifications that apply to a given shard $S_i$ may be denoted $O(S_i)$ and $M(S_i)$. More specifically, for each shard $S_i \in T$, $O(S_i)$ identifies all data/account constraints that must be satisfied at $S_i$ in order for the transaction to proceed, and $M(S_i)$ defines all modifications to occur at data/accounts at $S_i$ if the transaction proceeds to the commit phase.

In some embodiments, a multi-shard transaction consists of several transaction fragments, with each fragment involving execution of one or more data operations (reads and/or writes) within a single corresponding shard. The transaction may or may not involve cross-shard dependencies (e.g., a given shard may require data from one or more other shards in order to complete its read/write operation(s)) and/or involve data constraints.

For example, upon receipt of a transaction t that involves |T|shards (|T|>1), wherein the shards are logically ordered by unique identifiers, during a first traversal each shard $S_i \in T$: locks data identified in a read-write set for the shard, completes any such read/write operations that can be completed (but without yet making resulting changes visible to other transactions and clients), checks whether any data constraints exist, and determines among the shard's replicas whether the transaction should be committed or aborted. The last shard in order makes the final commit/abort decision. During a second traversal of the involved shards the global commit or abort decision is exchanged among the shards, any remaining read/write operations are executed and made visible for all purposes, and data locks are released.

Within a given shard, processing of a transaction may occur in parallel among all replicas. After the replicas finish their processing, they each forward the transaction to at least one replica in the next shard in ring order. Advantageously, communications between shards while conducting a transaction are linear in nature, such that each node or replica in a given shard need only communicate with one corresponding node in a subsequent shard.

For a multi-shard transaction that involves a cross-shard dependency (i.e., at least one shard requires data from at least one different shard), the involved shards operate in turn as described above except that each shard will forward (with its decision to commit) data needed by one or more other shards to resolve the dependency. That data will eventually be delivered to the dependent shard.

For a multi-shard transaction t involving |T|shards (|T|>1) and featuring one or more data constraints (e.g., a data item stored at a shard must have a particular value, or a value within a specified range of values, in order for the transaction to proceed), during a first traversal of the involved shards each shard $S_i \in T$: locks data identified in the read-write set for the shard, completes any read/write operations that do not require data from another shard (but without yet making resulting changes visible to other transactions and clients), checks whether any data constraints at the shard are satisfied (unless said checking requires data from another shard), determines among the shard's replicas whether the transaction should be committed or aborted (if the determination does not require data from another shard), and passes with its consensus decision any data needed by another shard. The last shard in order evaluates any outstanding data dependencies or constraints and makes the final commit/abort decision. During a second traversal of the involved shards, the global commit or abort decision is exchanged among the shards, any remaining read/write operations are executed and made visible for all purposes, and data locks are released.

In some alternative embodiments, such as when a large volume of data must be exchanged among two or more shards, a multi-shard transaction may involve three traversals of the ordered shards. In the first traversal, locks are applied to pertinent data, read/write operations that can be performed are executed (without yet making the changes visible to other transactions and clients), database constraints are examined to determine if they are satisfied (except those that rely on data from other shards), consensus among the shard's nodes regarding commit or abort is achieved if not dependent on other shards, and data from the shard that is needed by other shards is transferred with the shard's local commit/abort decision (if the decision was made). In a second traversal, each shard receives the data needed from other shards (if any), local data constraints are fully evaluated, the shard's local commit/abort consensus is achieved, and the final shard in order makes the global commit decision if appropriate. During the final traversal, the global commit (or abort) decision is exchanged, final read/write operations are applied and made visible, and all locks are released.

Figure 2:
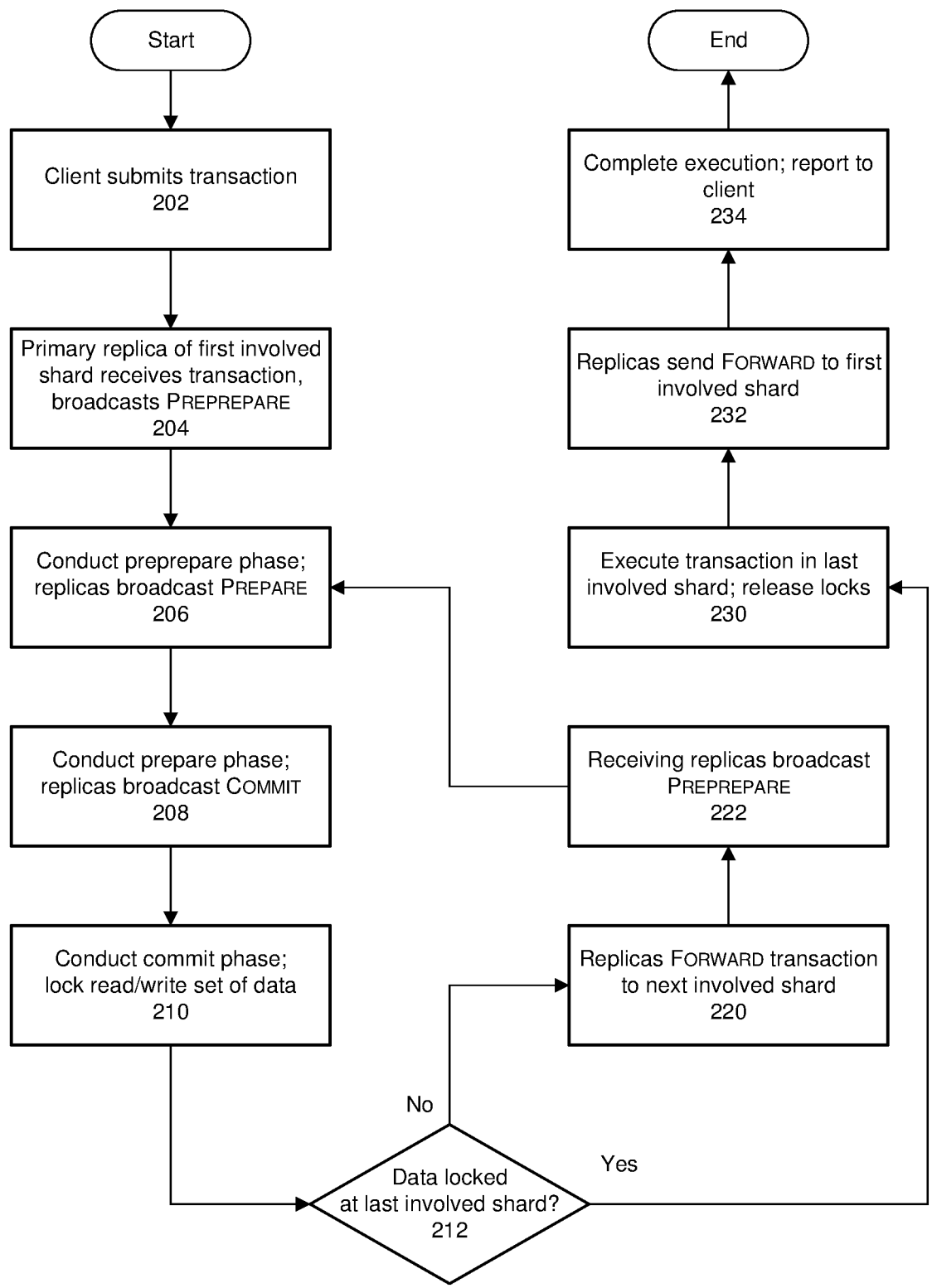
FIG. 2 is a flow chart illustrating a method of completing a multi-shard transaction in a ring-ordered manner, in accordance with some embodiments.

FIG. 2 is a flow chart illustrating a method of completing a multi-shard transaction in a ring-ordered manner, according to some embodiments. In one or more embodiments, one or more of the operations may be omitted, repeated, and/or performed in a different order. Accordingly, the specific arrangement of steps shown in FIG. 2 should not be construed as limiting the scope of the embodiments.

In addition, the method illustrated in FIG. 2 reflects the use of PBFT as the local consensus protocol in all involved shards. As already discussed, however, in different embodiments different local consensus protocols may be used, and different shards may even use different local consensus protocols. Thus, the method of FIG. 2 may be modified to incorporate a different consensus protocol (other than PBFT) without exceeding the scope of the illustrated embodiment.

In operation 202, a client computing system initiates a new transaction (or set of transactions) that requires access (read and/or write) to multiple shards within a resilient distributed database system, and submits the transaction. With the transaction, in some embodiments the client identifies all 'involved shards' (i.e., all shards at which data must be read from and/or written to the database), by identifier for example, and the read/write sets of those shards, if it is aware of the ring order and the distribution of data within the system.

In some alternative embodiments (e.g., in which a client is not aware of the shards' identifiers and/or how data are distributed), the transaction may first be received by an intermediary (a random replica, a different replica within the first involved shard, a primary replica of a different shard, a coordinator entity within the system), which forwards the transaction to the primary replica of the 'first involved shard' (i.e., the involved shard that is first in ring order among all involved shards).

The first recipient of the transaction examines the transaction to ensure it is well-formed (e.g., complete, formatted correctly, not corrupted). And, as just indicated, the first recipient forwards the transaction to the primary replica of the first involved shard if the first recipient is not the primary replica of the first involved shard.

In operation 204, the transaction is received at the primary replica of the first involved shard. This replica assigns the transaction a linearly increasing sequence number, calculates a message digest (e.g., a hash of some or all transaction contents), and proposes the transaction to all other replicas in the first involved shard. For example, it may broadcast a specific message dictated by the local consensus protocol (e.g., a PREPREPARE message if PBFT is implemented among the replicas). The sequence number may identify the primary replica and/or the first involved shard; this precaution ensures there will be no collision between sequence numbers assigned by different shards and primary replicas.

In operation 206, the replicas perform some initial checks of the transaction and/or the message in which the transaction was proposed. For example, a preprepare phase may be conducted within the shard, wherein each replica determines whether the PREPREPARE message received from the primary replica is well-formed and whether it has already received another transaction with the same sequence number from the same originator (i.e., the primary replica of the first involved shard). If these checks pass, each replica broadcasts a pertinent message (e.g., a PREPARE message) within the shard.

In operation 208, the shard's replicas attempt to obtain consensus regarding the transaction. For example, a prepare phase may be conducted, wherein each replica determines whether it has received a sufficient number of identical and well-formed PREPARE messages. In particular, each replica must receive identical messages from more than ⅔ the total number of replicas within the shard. If this occurs, each replica broadcasts a corresponding message (e.g., a COMMIT message) to replicas within the current shard and marks the transaction 'prepared.'

In operation 210, each replica that receives well-formed and identical COMMIT messages from more than ⅔ the total number of shard replicas determines whether it has marked as 'prepared' the same transaction having the same sequence number. If so, the replicas locally lock the read/write set of data for the shard.

In operation 212, execution of the illustrated method depends upon whether the current shard is the 'last involved shard' (i.e., the shard involved in the transaction that is last in ring order among all involved shards). If the current shard is not the last involved shard, the method continues at operation 220. If the current shard is the last involved shard, then all necessary data has been locked within the involved shards and the method advances to operation 230.

In operation 220, the current shard's replicas each send a FORWARD message to a single replica in the next involved shard in ring order. In some embodiments, replicas within each shard of the system are ordered in the same way, such as with consecutive integer values starting with zero or one, and a given replica $r_{i,x}$ (the $x^{th}$ replica in $S_i$) communicates with the corresponding replica $r_{j,x}$, wherein $S_i$ and $S_j$ are successive involved shards in ring order.

Therefore, as long as each shard has approximately the same number of replicas, and the number of faulty replicas ($f_i, f_j$) in each of the current and subsequent involved shards ($S_i$, $S_j$) is less than ⅓ the total number of replicas in the shard, at least $f_i+1$ non-faulty replicas in $S_i$ will communicate with $f_j+1$ non-faulty replicas in $S_j$.

With the FORWARD message, which causes the recipient replica to initiate the local consensus protocol in the recipient's shard, each replica in the current shard sends proof that the transaction was committed in the current shard. For example, each replica may include with the FORWARD message digital signatures of COMMIT messages received from more than ⅔ the total number of replicas in the shard. The recipient could use the corresponding public keys of those nodes to verify the signatures. Replicas also forward any data that are required by other shards (e.g., for resolving data dependencies)—including required data from the current shard and any required data received from prior involved shards and needed by later involved shards.

In operation 222, each replica in the next involved shard that receives a Forward message from a replica in the previous shard broadcasts the necessary message (e.g., PREPREPARE messages) to the other replicas in its shard. The method then returns to operation 206 to conduct the preprepare phase in the next (current) shard. Thus, operations 206 through 222 repeat for successive involved shards to conduct the different phases of operation and forward the processing to the next shard in sequence.

In operation 230, the replicas in the current shard (the last involved shard) execute the transaction and release the data locks. For transactions that involve no data dependencies between shards (e.g., no shard needs data from another shard or information regarding another shard's data—such as a comparison between a data item and a target value), all involved shards may perform the same actions (to execute the transaction and release the locks) independently of other shards. However, multi-shard transactions require additional processing.

In operation 232, the replicas in the last involved shard send EXECUTE (or FORWARD) messages to replicas of the first involved shard, in the manner described above. For example, each replica sends the EXECUTE message to the replica in the first involved shard that has the same identifier.

In operation 234, execution of the transaction continues at the first involved shard, which consumes any data that it required from other shards and that was received with the EXECUTE message.

In operation 236, transaction execution proceeds through the remaining involved shards, in ring order. As each shard executes its portion of the transaction, it transmits an EXECUTE message to the succeeding shard.

In addition, completion of the transaction and any results of the transaction are reported to the client by the primary replica (and/or other replicas) of the first involved shard, by the primary replica (and/or other replicas) of the involved shard that was last to execute its portion of the transaction, or possibly even by all primary replicas (and/or other replicas) of all involved shards. In particular, after all shards reach a global consensus to commit the transaction, the transaction is guaranteed to execute, and so the client can be informed anytime afterward, by one or more shards. The method then ends for the current transaction.

Although local consensus-gathering in each involved shard proceeds in a manner similar to PBFT in the illustrated method, in other embodiments other consensus protocols may be applied. An important distinction, however, is the novel method of communication between shards that is linear in nature and therefore requires less interaction than many existing protocols.

During the illustrated method, if consensus fails within an involved shard, such as during any of the preprepare, prepare, and commit phases, the current shard aborts the transaction, notifies the client and begins notifying preceding involved shards. The current shard may notify all preceding involved shards directly, or may notify the immediately preceding shard, which notifies the next, and so on.

In embodiments of ring-ordered processing of multi-shard transactions described herein, replicas within a given shard may process and broadcast PREPARE and COMMIT messages out of order. However, the replicas may be required to acquire data locks on data in order (e.g., according to the transactions' sequence numbers).

Therefore, each replica in each shard maintains a list or queue for storing pending transactions. Pending transactions may be defined as transactions for which the replica has received the necessary number of COMMIT messages from other replicas in the same shard to proceed to the data-locking phase, but for which locks cannot yet be obtained. For example, after locks are applied for a given transaction k (denoted $t_k$) that requires access to a given data item a, and assuming no other data items are locked, subsequent transactions such as $t_{k+1}$, $t_{k+2}$, $t_{k+3}$, etc. may be stored or may proceed, depending on the data that needs to be locked in order to execute them.

Thus, if transaction $t_{k+1}$ also needs to access data item a, no transactions can be removed from the pending list until $t_k$ completes execution and its locks are removed, at which time data item a can again be locked for $t_{k+1}$. Conversely, if $t_{k+1}$ requires locks only on data items other than a, such as just data item b, it can be removed from the pending list and processed. Then transaction $t_{k+2}$ is considered in the same manner, with its handling and the handling of subsequent transactions depending on whether $t_{k+2}$ requires access to locked items a or b.

Because different sets of shards in the system will be involved in different transactions, different sequences of transactions will also be conducted in parallel. That is, every shard in the system may be the 'first involved shard' for any number of multi-shard transactions, except the shard having the last (e.g., highest or lowest) identifier among the shards, which can be the 'first involved shard' only for single-shard transactions that only involve that shard. The primary replica of each of the shards (except possibly the last in order) will therefore maintain its own series of sequence numbers for multi-shard transactions, and each transaction it initiates will identify that sequence number and the primary replica and/or shard from which the transaction originated.

This scheme means that replicas may maintain multiple lists of pending transactions, one for each shard (or each primary replica) that may originate a multi-shard transaction. Each list may be considered part of a separate "flow" of transactions and will help ensure that data locks for each flow's transactions are obtained in order, even while all replicas are able to continue processing transactions out of order (e.g., by exchanging PREPARE and COMMIT messages if the local consensus is PBFT).

In some embodiments, replicas employ timers to detect errors in the processing of a transaction (e.g., caused by a faulty node) and/or attacks by malicious nodes. One timer that may be employed by replicas is a 'transmit' timer for tracking transmission of a multi-shard transaction between shards. A replica may start a transmit timer for a particular transaction after it witnesses successful consensus on the transaction within its shard (e.g., by receiving a threshold number of proper COMMIT messages) and before issuing a FORWARD message to its corresponding replica in the next involved shard in ring order. If and when the transmit timer expires, the replica re-sends the FORWARD message.

A 'local' timer is a timer that a replica may use to track replication of a transaction within the replica's shard (e.g., as part of the preprepare, prepare, or commit phase of PBFT). It may be activated upon some discrete event or when the replica is unable to make progress on a transaction. When the replica's local timer expires, it initiates a process to replace the primary of its shard through a view change. More particularly, every replica in the shard broadcasts a particular message (e.g., a VIEWCHANGE message) within the shard when its local timer expires. Each replica that receives a threshold number copies of this message from other replicas in the shard will begin recognizing as the new primary the next replica in sequence after the current primary (the replica next in order according to the nodes' identifiers within the shard).

A replica may employ a 'remote' timer to track replication of a multi-shard transaction within the preceding involved shard in ring order. This timer is activated after the replica receives a FORWARD message from the corresponding node of the preceding involved shard (the node having the same identifier) and broadcasts the FORWARD message within its shard. If the replica does not receive identical FORWARD messages from a threshold number of other replicas before the remote timer expires, it issues a REMOTEVIEWCHANGE message to the corresponding node of the preceding involved shard, and broadcasts that message within its own shard. Within the preceding involved shard, a replica that receives a REMOTEVIEWCHANGE message broadcasts it within the shard. Every replica that receives a threshold number of these messages from its fellow replicas will support the view change and recognize a new primary replica.

In some embodiments in which these three timers are employed together, the local timer has the shortest relative duration and will assist in the detection of a malicious primary node. The transmit timer has the longest relative duration, and the remote timer falls between the two in terms of duration.

Orchestration & Execution of Multi-Shard Transactions

As introduced above, in some embodiments multi-shard transactions against a distributed database within a Byzantine computing environment are conducted according to an orchestrate-execute model (OEM) that provides for two-phased transaction commitment and/or two-phased locking of data.

In these embodiments, during an orchestration stage a new transaction is replicated among involved shards (i.e., shards that must read and/or write data as part of the transaction) and each involved shard determines whether to commit or abort the transaction, and may lock data as necessary. During subsequent execution of the transaction, which occurs only if all involved shards commit the transaction, necessary data modifications (i.e., writes) are applied, data locks are released, and the client is notified of the success of the transaction. If orchestration or execution fails at any point, data modifications made in furtherance of the transaction (if any), are unwound and the client is notified of the failure of the transaction.

In these embodiments, virtually any consensus-gathering protocol may be employed within a given shard, as with embodiments described in the preceding section. Between shards, a communication protocol is employed that ensures reliable communication between a first shard (e.g., one or more replicas within the first shard) and a second shard (e.g., one or more replicas within the second shard) as long as: (a) the communication is sent only if non-faulty replicas within the first shard agree that the communication is to be sent, (b) all non-faulty replicas in the second shard receive the communication, and (c) all non-faulty replicas in the first shard receive confirmation of receipt of the communication by the second shard. Thus, in these embodiments, it is assumed that no network problems interrupt or prevent communication between shards.

As explained in a previous section, a given transaction may be represented as $t=(O, M)$, and the set of shards T involved in the transaction includes all shards that must execute set M of modifications, and also includes all shards at which set O of constraints must be examined.

In some embodiments, each shard involved in a transaction performs one or more of three defined steps or actions, depending on the shard's involvement in the transaction: vote, commit, and abort. Vote actions entail voting for or against commitment of the transaction, and must be undertaken by every shard $S_i \in T$ such that $O(S_i) \neq \emptyset$, and by every shard that must lock data for reading and/or writing. If the shard can verify or satisfy all data constraints or conditions levied upon the shard by the transaction, the shard will vote for commitment. Otherwise, it will vote against commitment (i.e., to abort the transaction).

For example, if the transaction requires a certain data item stored at the shard to have a certain value or range of values, or to have a value with a particular relation to a certain value (e.g., greater than, less than), or requires the value of a data item to be read and provided to another shard, and the shard's replicas can agree on the data item's value or that the item's value satisfies the constraint or condition, the replicas will concur that the transaction should be committed and the shard's vote will be to commit.

If the shard's replicas reach consensus for commitment, they may also make any local changes that don't require information from another shard that they do not already have. For example, they may modify local data as required by the shard's set of modifications (i.e., $M(S_i)$) and/or acquire locks on data that will be modified. In some implementations, a shard may read data without voting (e.g., if the shard does not need to modify any data) perhaps to send the data to another shard.

A commit action, which occurs only after all shards that must perform vote actions have voted to commit, must be undertaken by every shard $S_i \in T$ such that $M(S_i) \neq \emptyset$, and by every shard that locks data. Commit action involves performing data operations that execute and finalize the transaction, such as modifying shard data and then releasing locks. In some implementations or environments, a shard that performs a vote action may be able to write data (and unlock locked data) in concert with that action, instead of performing a separate commit action.

Finally, an abort action by a shard involves rolling back any data operations that were conducted at the shard prior to the transaction being aborted (e.g., to undo local data modifications, to release locks). Usually, only shards that executed one or more data modifications or that locked data will have abort actions, and will only need to perform the abort action if the transaction proceeded far enough to cause corresponding locks to be held or the data modifications to be made.

For a given transaction t, set T denotes and includes shards involved in the transaction. In addition, a set V of shards may be defined to include involved shards that have vote actions, a set C of shards may be defined to include involved shards that have commit actions, and a set A of shards may be defined to include involved shards that have abort actions. Thus, $T = V \cup C \cup A$.

In different embodiments and/or different computing environments, different types of orchestrations may be conducted. Illustrative options include linear orchestration, centralized orchestration, and distributed orchestration. Some or all of these options, which are described below with reference to FIGS. 3-5, may be used simultaneously. For example, some transactions that involve a particular set of shards may be executed using centralized orchestration while other transactions that involve some or all of the same shards may be executed using distributed orchestration.

Figure 3:
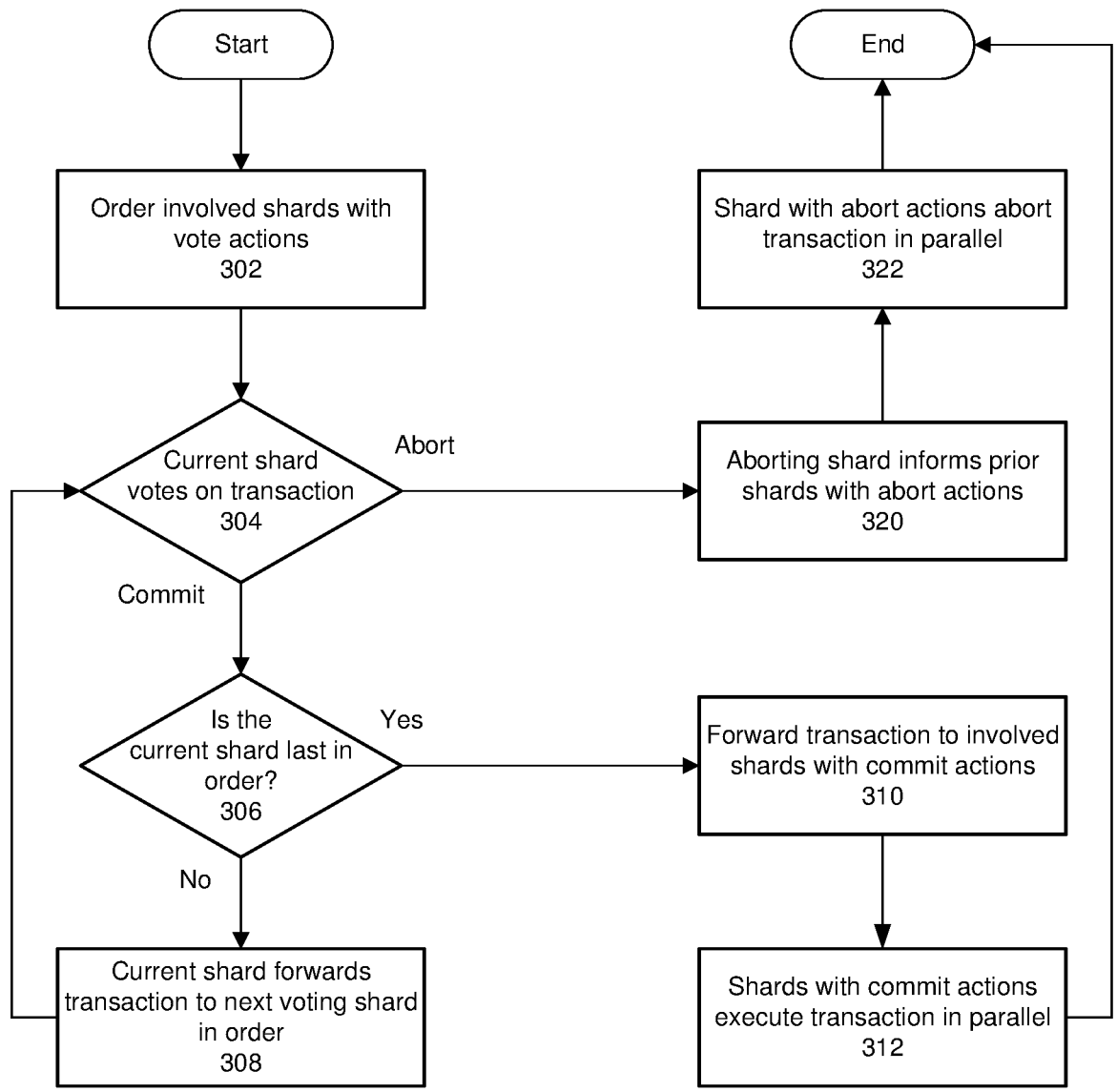
FIG. 3 is a flow chart illustrating linear orchestration of a transaction, in accordance with some embodiments.

FIG. 3 is a flow chart illustrating linear orchestration of a new multi-shard transaction, according to some embodiments. In one or more embodiments, one or more of the operations may be omitted, repeated, and/or performed in a different order. Accordingly, the specific arrangement of steps shown in FIG. 3 should not be construed as limiting the scope of the embodiments.

In operation 302, database shards that are involved in the transaction and that must take vote actions are ordered. Thus, assuming that n shards will vote on the transaction, $V = \{S_1, S_2, \ldots, S_{n-1}, S_n\}$.

The ordering may be based on inherent shard identifiers, as described in the preceding section, or may be based on some other criteria. For example, if data dependencies exist, such that one or more shards' vote actions, depend on data stored at other shards, the ordering of the shards may be arranged such that shards that depend upon data or information from other shards are ordered after those other shards.

In operation 304, the current shard in order (e.g., the first-ordered shard during the first iteration of this operation) receives the transaction and executes a vote procedure by seeking consensus among its replica nodes (according to the local consensus protocol) as to whether the transaction should be committed or aborted. If the replicas come to a consensus that the transaction should proceed, because all data conditions or constraints imposed on the shard by the transaction are satisfied, for example, the shard votes to commit. Conversely, if the consensus is that the transaction should be terminated, because of an unsatisfied data constraint or an error within the transaction, for example, the shard votes to abort. In addition, during the voting procedure the shard (the shard's replicas) may lock data as necessary.

If the current shard votes to commit, the method continues at operation 306; otherwise, the method advances to operation 320.

In operation 306, further operations depend upon whether all member shards of V have voted. If the current shard, which just voted to commit the transaction, is the last-ordered shard, the method advances to operation 310; otherwise, the method continues at operation 308.

In operation 308, the current shard (e.g., $S_i$) forwards the transaction to the next voting shard in order (e.g., $S_{i+1}$). In some implementations, forwarding the transaction requires each replica of the current shard to send the transaction to the corresponding replica of the next shard in order. As described previously, replicas may have sequential or other predetermined identifiers in every shard, and replicas having the same identifier in different shards are considered to be corresponding replicas. After operation 308, the illustrated method returns to operation 304 so that the next-ordered shard, which now becomes the current shard, can vote.

In operation 310, all involved shards with vote actions (i.e., all members of V) have voted to commit the transaction. Therefore, the last-ordered shard forwards the transaction to all involved shards that have commit actions for this transaction (i.e., all members of C). Note that one or more shards that had vote actions may also have commit actions, and that one or more shards with commit actions may not have had vote actions.

In some embodiments, a forwarded transaction is accompanied by metadata that may provide, among other information, identities of shards that committed the transaction, data required by one or shards that have commit actions (e.g., provided by shards that had vote actions), etc.

In operation 312, all shards with commit actions perform a commitment process in parallel to execute the transaction, such as by locking data to be written (if not already locked), executing the write(s), and releasing all data locks. After operation 312, one or more shards with commit actions report to the client that submitted the transaction, to report success, and the method ends.

In operation 320, the current shard voted to abort the transaction. That shard reports to all preceding shards that have abort actions (i.e., shards with both vote and abort actions that precede the current shard in order).

In operation 322, the shards with abort actions abort the transaction in parallel, by undoing any data changes they made and releasing any data locks. The method then ends.

In some embodiments, involved shards with vote actions are ordered so that voting shards that also have abort actions (i.e., each shard belonging to V ∩ A) are last in order. This speeds the process of aborting a transaction in many cases because a decision to abort the transaction is more likely to occur prior to any shards doing anything that must be undone.

In these and/or other embodiments, if it can be determined that some vote actions involve higher likelihoods of failure of an associated data constraint or condition, such that the corresponding shard has a greater chance of voting to abort the transaction, shards with the identified vote actions may be placed earlier in the order than other shards.

Figure 4:
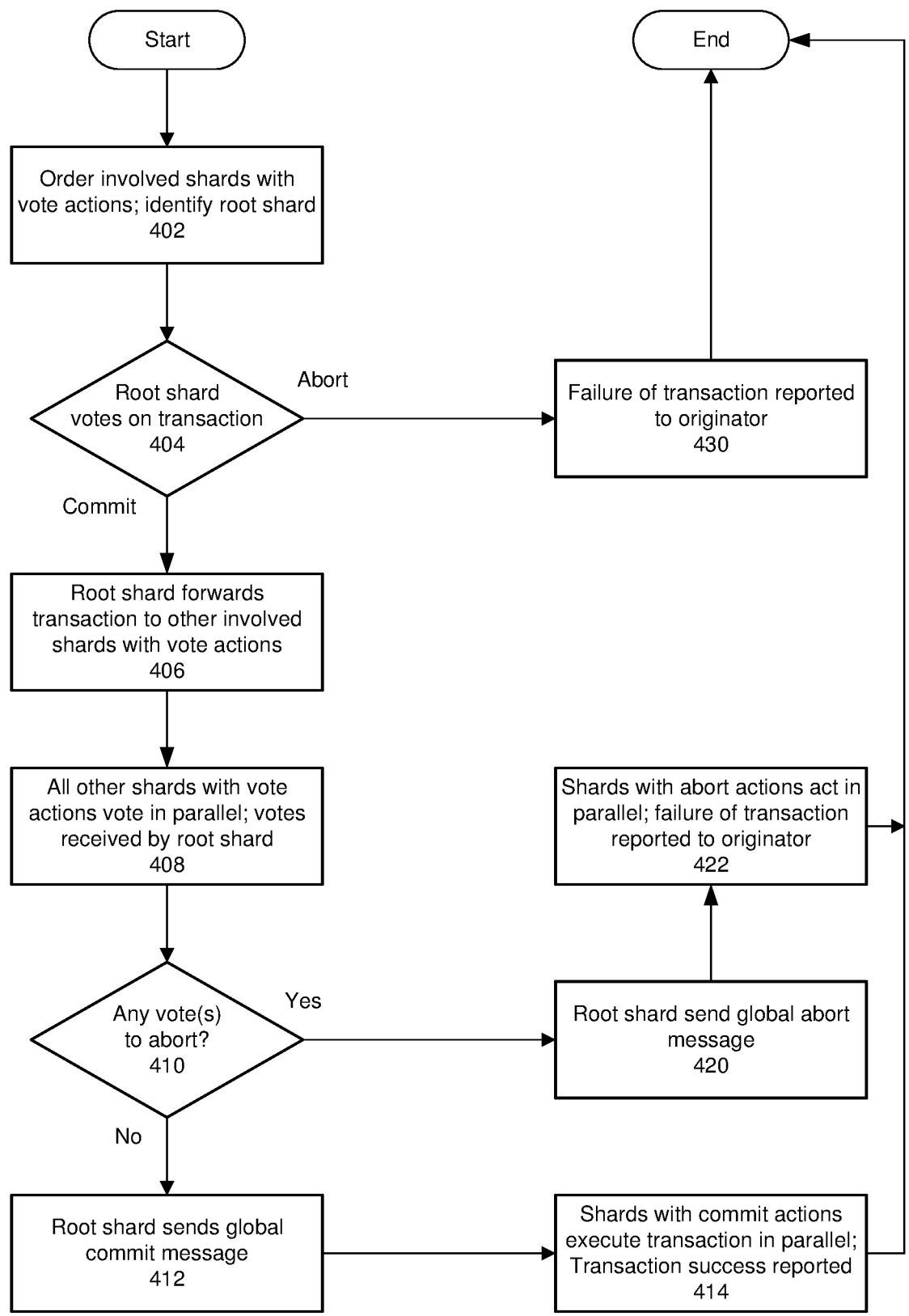
FIG. 4 is a flow chart illustrating centralized orchestration of a transaction, in accordance with some embodiments.

FIG. 4 is a flow chart illustrating centralized orchestration of a transaction, according to some embodiments. Whereas linear orchestration requires sequential voting by all shards with vote actions, with centralized orchestration (and distributed orchestration, as seen below) vote actions occur in parallel. In one or more embodiments, one or more of the operations may be omitted, repeated, and/or performed in a different order. Accordingly, the specific arrangement of steps shown in FIG. 4 should not be construed as limiting the scope of the embodiments.

In operation 402, database shards that are involved in a new transaction and that must take vote actions may be ordered, similar to the ordering performed for linear orchestration, and one of the voting shards is selected to serve as root shard for the transaction, denoted $S_r$. Thus, assuming that n shards are involved in the transactions with vote actions, $V=\{S_r, S_1, S_2, \ldots, S_{n-1}\}$. Different involved shards may serve as root for different transactions. For example, after the set of involved shards is determined, any shard that has a vote action may be designated root.

In operation 404, the root shard receives the transaction, if it does not already have it, and executes a vote procedure by seeking consensus among its replica nodes (according to the local consensus protocol) as to whether the transaction should be committed or aborted. If the replicas come to a consensus that the transaction should proceed, because all data conditions or constraints imposed on the shard by the transaction are satisfied, for example, the shard votes to commit. In addition, during the voting procedure the root shard (the root shard's replicas) may lock data as necessary.

Conversely, if the consensus is that the transaction should be terminated, because of an unsatisfied data constraint or an error within the transaction, for example, the shard votes to abort. If the root shard voted to abort the transaction, the illustrated method advances to operation 430; otherwise, the method continues at operation 406.

In operation 406, root shard $S_r$ forwards the transaction to all other involved shards that have vote actions (i.e., to all members of V except itself). In some implementations, forwarding the transaction requires each replica of the root shard to send the transaction to the corresponding replicas of all other voting shards.

In operation 408, all other shards with vote actions vote in parallel on whether to commit or to abort the transaction. Each voting shard applies its local consensus protocol to complete the voting, which may involve replicating the received transaction among all nodes. Each shard reports its vote to $S_r$—this may illustratively involve some or all replicas of the shard reporting to $S_r$, or may involve a primary replica of the shard sending one report, depending on the consensus protocol applied at the shard. During the voting procedure the shard (the shard's replicas) may lock data as necessary.

In operation 410, if any of the other voting shards voted to abort the transaction, the method advances to operation 420; otherwise, the method continues at operation 412.

In operation 412, all voting shards (i.e., all members of V) agree that the transaction should proceed. In some implementations, replicas within $S_r$ receive votes from voting shards, replicate them, and apply a local consensus protocol to determine whether the commit votes are valid before the transaction can proceed. If the transaction is to proceed, $S_r$ sends a global commit message to all shards that have commit actions.

In operation 414, all shards with commit actions perform necessary commitment activity in parallel to execute the transaction (e.g., by writing data, releasing locks). The root shard and/or other shards report the success of the transaction to the originator (e.g., the client that initiated the transaction). After operation 414, the method ends.

In operation 420, $S_r$ sends a global abort message to all shards that have abort actions.

In operation 422, shards that have abort actions and did not already perform the abort process conduct the abort process in parallel. The root shard and/or other shards report failure of the transaction to the originator. The method then ends.

In operation 430, the root shard reports failure of the transaction to the originator. The method then ends.

Figure 5:
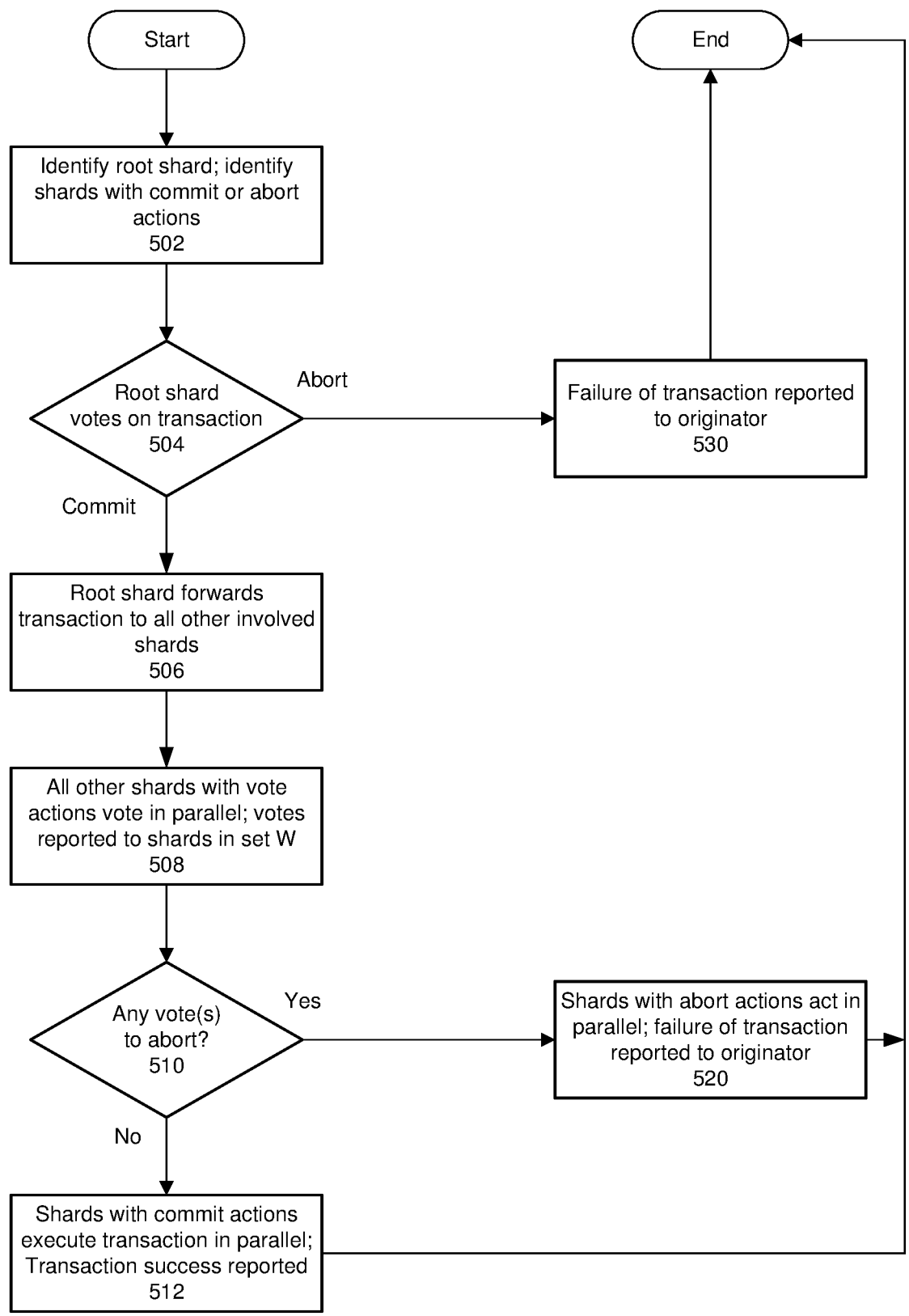
FIG. 5 is a flow chart illustrating distributed orchestration of a transaction, in accordance with some embodiments.

FIG. 5 is a flow chart illustrating distributed orchestration of a transaction, according to some embodiments. In these embodiments, only three consecutive consensus steps are required, as opposed to the four consecutive steps associated with centralized orchestration. In addition, with distributed orchestration voting shards need not be ordered as they were for linear orchestration. In one or more embodiments, one or more of the operations may be omitted, repeated, and/or performed in a different order. Accordingly, the specific arrangement of steps shown in FIG. 5 should not be construed as limiting the scope of the embodiments.

In operation 502, one of the involved shards with a vote action is selected to serve as root shard for the transaction, denoted $S_r$. Different involved shards may serve as root for different transactions. For example, after the set of involved shards is determined, and actions identified for each involved shard (i.e., vote, commit, and/or abort), any of them that have a vote action may be designated root. In addition, a subset W of involved shards (W⊆T) is identified to include all involved shards that have commit and/or abort actions; therefore W=C∪A.

In operation 504, the root shard receives the transaction, if it does not already have it, and executes a vote procedure by seeking consensus among its replica nodes (according to the local consensus protocol) as to whether the transaction should be committed or aborted. If the replicas come to a consensus that the transaction should proceed, because data conditions or constraints imposed on the shard by the transaction are satisfied, for example, the shard votes to commit. In addition, during the voting procedure the root shard (the root shard's replicas) may lock data as necessary.

Conversely, if the consensus is that the transaction should be terminated, because of an unsatisfied data constraint or an error within the transaction, for example, the shard votes to abort. If the root shard votes to abort the transaction, the illustrated method advances to operation 530; otherwise, the method continues at operation 506.

In operation 506, the root shard forwards the transaction to all members of T except itself, which means that all other involved shards that have vote, commit, and/or abort actions will receive the transaction directly from $S_r$. In some implementations, forwarding the transaction requires each replica of the root shard to send or broadcast the transaction to corresponding replicas of all other involved shards.

In operation 508, all shards with vote actions (other than $S_r$) vote in parallel on whether to commit or abort the transaction. Each voting shard applies its local consensus protocol to complete the voting, which may involve replicating the received transaction among all nodes. Each voting shard reports its vote to all shards in set W, and may also report to $S_r$ even if the root shard does not have a commit or abort action. This manner of reporting a shard's vote may illustratively involve some or all replicas of the shard reporting to corresponding replicas of the recipient shards, or may involve a primary replica of the shard sending one report to each recipient shard. During the voting procedure the shard (the shard's replicas) may lock data as necessary.

In operation 510, if any of the voting shards other than $S_r$ voted to abort the transaction, the method advances to operation 520; otherwise, the method continues at operation 512. If $S_r$ had voted to abort the transaction, operation 510 would not have been reached.

In operation 512, all voting shards (i.e., all members of V) voted to commit the transaction, and all shards with commit actions (i.e., all members of C) were directly informed by the voting shards. Upon receipt of n−1 commit votes from non-root voting shards plus the original commit vote received from $S_r$, each node with commit action performs necessary commitment activity in parallel to execute the transaction (e.g., by writing data, releasing locks). The root shard and/or other shards report the success of the transaction to the originator (e.g., the client that initiated the transaction). After operation 512, the method ends.

In operation 520, all shards with abort actions received the abort vote(s) direct from the shard or shards that voted to abort. The members of A therefore conduct the abort process in parallel. The root shard and/or other shards report failure of the transaction to the originator. The method then ends.

In operation 530, the root shard reports failure of the transaction to the originator. The method then ends.

Figure 6:
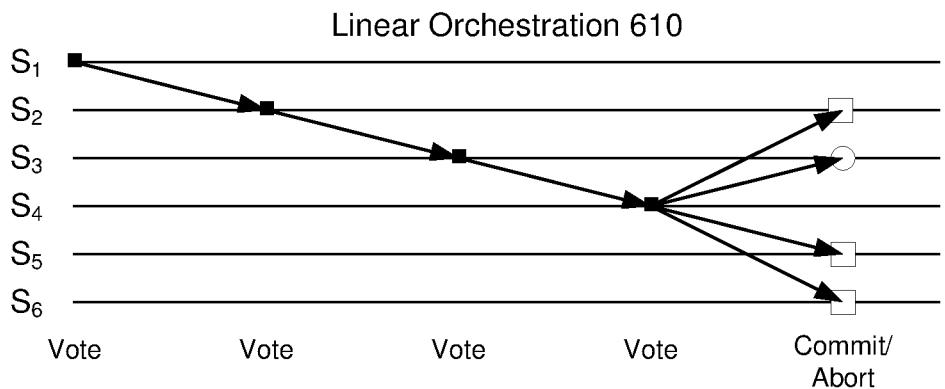
FIG. 6 illustrates linear, centralized, and distributed orchestration in accordance with some embodiments.
Figure 6:
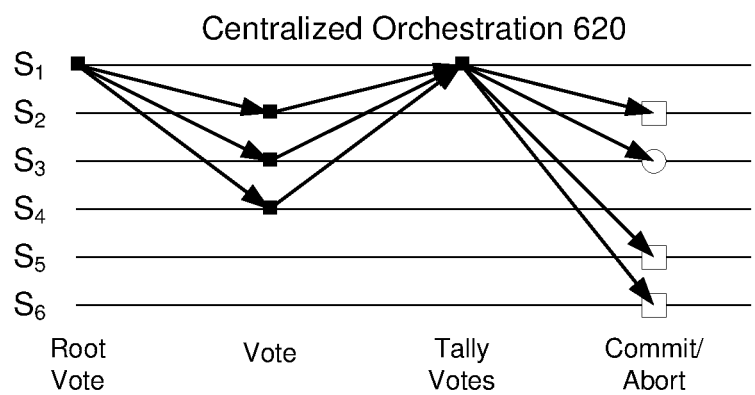
Figure 6:
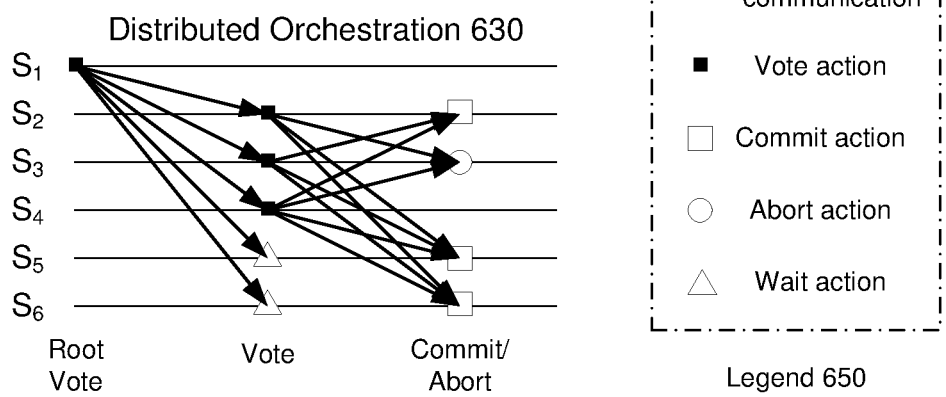

FIG. 6 illustrates linear, centralized, and distributed orchestration and execution of a transaction, according to some embodiments. In these embodiments, the transaction involves six shards; T={$S_1$, $S_2$, $S_3$, $S_4$, $S_5$, $S_6$}, V={$S_1$, $S_2$, $S_3$, $S_4$}, C={$S_2$, $S_5$, $S_6$}, and A={$S_3$}.

As described above with reference to FIG. 3, linear orchestration 610 involves linear activity among voting shards V to determine whether to commit or abort the transaction. If all shards in V agree, the transaction is committed and executed in parallel at shards that belong to C.

It may be noted that if the transaction is aborted, inter-cluster communication is required only if shards $S_1$, $S_2$, and $S_3$ all vote to commit, and then shard $S_4$ votes to abort. If shard $S_3$ had voted to abort, it could have proceeded immediately to its abort action, if necessary, because it is the only shard that must take action in the event the transaction is aborted. If $S_1$ or $S_2$ voted to abort, no data modification(s) would yet have occurred at $S_3$, and so the transaction could immediately be dropped without notifying $S_3$.

As described above with reference to FIG. 4, centralized orchestration 620 involves an isolated vote by the root shard (in this example $S_r$=$S_1$), followed by parallel voting by other voting shards (V−$S_r$), which report their votes to $S_r$. If all voting shards vote to commit, shards that belong to C are notified and execute the transaction in parallel.

If $S_r$ had voted to abort, the transaction could have been dropped immediately without notifying shard set A. In addition, if shard $S_3$ (or any other shard) had voted to abort, it could have proceeded immediately to its abort action without waiting for notification from $S_r$.

As described above with reference to FIG. 5, distributed orchestration 630 also involves an isolated vote by the root shard (in this example $S_r$=$S_1$), followed by parallel voting by other voting shards (V−$S_r$). The other voting shards, however, now broadcast or report their commit votes and abort votes to C and A. Note that $S_r$ notifies shards $S_5$, $S_6$ of its vote (which must have been a vote to commit and not to abort) when it prompts the other members of V to vote. Along with $S_2$, those shards now wait to receive commit votes from other voting shards, and will proceed with commitment and execution of the transaction after they are received.

If $S_r$ votes to abort during distributed orchestration, the transaction can be dropped immediately without notifying shard set A. In addition, if shard $S_3$ votes to abort, it can proceed immediately to its abort action without waiting for notification from $S_r$. However, if a different voting shard votes to abort, it must notify $S_3$ directly.

Resilient Concurrent Consensus

As introduced above, in some embodiments multiple (or all) replicas in a shard share the ability to initiate and obtain consensus on new transactions, which may be termed concurrent consensus. Each of the nodes or replicas thus acts as a concurrent primary and proposes transactions in a corresponding consensus instance that is independent of other concurrent primaries' instances. Embodiments of concurrent consensus may be implemented with previously discussed embodiments in which multi-shard transactions are conducted.

Applying concurrent consensus among a shard's replicas not only yields consensus on client transactions, but also on the order of those transactions. Moreover, the use of concurrent primaries increases the shard's throughput of transactions instead of being limited to what a single primary can achieve. Further, identifying and dealing with a faulty primary within one consensus instance does not interfere with ongoing operations in other consensus instances.

In some implementations, some number of a shard's replicas concurrently execute a Byzantine commit algorithm (BCA) that detects faulty replicas (particularly faulty primaries) in a Byzantine computing environment featuring n replicas, f of which may be faulty or malicious at a given time, wherein n>3*f. The number of non-faulty replicas may be denoted nf, wherein nf=n−f.

Moreover, replicas may concurrently execute multiple instances of the BCA, such as one for each consensus instance. While the number of consensus instances may initially equal n, a particular consensus instance may be terminated by other replicas if its corresponding primary is deemed faulty by the BCA as executed by other replicas.

The same BCA or different BCAs may be simultaneously executed at different replicas. PBFT (Practical Byzantine Fault Tolerance) is an illustrative example of a suitable BCA when modified to operate as described herein. Other examples include Zyzzyva, SBFT, and HotStuff which, like PBFT, can be modified to support resilient concurrent consensus as described herein.

Execution of a BCA to provide concurrent consensus among a set of replica nodes proceeds in rounds, wherein during each round each concurrent primary may propose a set of transactions within its consensus instance. In an illustrative implementation, a base sequence number for uniquely identifying transactions within a shard increases with each round, with each consensus instance using a form of the base sequence number for the transactions it proposes.

For example, round number 1 corresponds to sequence number 1, round number 2 corresponds to sequence number 2, etc. The n consensus instances number their transactions (or sets of transactions) based on the sequence number. Thus, in round 1 the instances will assign sequence numbers 1a, 1b, . . . , 1n. In round 2 the instances will use sequence numbers 2a, 2b, . . . , 2n; and so on.

As implemented in an embodiment disclosed herein, a BCA provides the following guarantees within a cluster (or shard) of n replicas (wherein n>3f): (1) if no failures are encountered in a given round of the BCA, at least nf-f non-faulty replicas have accepted a proposed transaction during the round; (2) when a given non-faulty replica accepts a transaction t during a given round, all other non-faulty replicas that accepted at least one transaction during the round also accepted t; (3) if a non-faulty replica accepts a transaction t, that transaction can be recovered from the states of any subset of nf-f non-faulty replicas; and (4) if the primary replica that proposes a transaction t during a given round is non-faulty and communication is reliable (e.g., no network failures), all non-faulty replicas will accept the proposed transaction.

In some embodiments, instead of one replica being permanently associated with a particular consensus instance and therefore always acting as the primary replica for that instance, the role of primary replica for some consensus instances may rotate among replicas. For example, during each round, each replica may act as primary for a different instance, and during the next round, some or all associations may change such that some or all consensus instances have a different associated primary replica. In these embodiments, failure of a given replica or malicious behavior of a given replica may be easier to detect and also have less impact because transactions affected by the failed or malicious node within a particular instance during a particular round can be recovered when a different replica becomes primary of that instance.

Among the n nodes or replicas of a set of data, we may denote the number of concurrently operating consensus instances as m, wherein 1<m≤n. Thus, m occurrences of the local BCA operate in parallel to increase the number of transactions (or sets of transactions) that can be processed simultaneously. $I_i$ denotes the $i^{th}$ consensus instance and BCA instance, and pi represents the replica currently serving as primary for $I_i$. 'Instance,' 'consensus instance,' and 'BCA instance' may be used interchangeably herein.

Each round of operation of concurrent consensus involves three phases—proposal, ordering, and execution. During the proposal phase, the primary replica for each of the m instances proposes a transaction (or set of transactions) by broadcast to all other replicas. In the ordering phase, each replica collects the proposed transactions and deterministically orders them, while also participating in the consensus process to ensure the transactions are valid and the replicas agree on their composition. Any criteria or scheme may be used to order the transactions, as long as the scheme is deterministic and is applied identically among the participants. In some implementations random ordering may be applied at the end of a round in order to frustrate certain malicious activity (e.g., ordering attacks). Finally, in the execution phase, each replica executes the collected transactions in order and informs the corresponding clients of the outcomes of their transactions.

Figure 7:
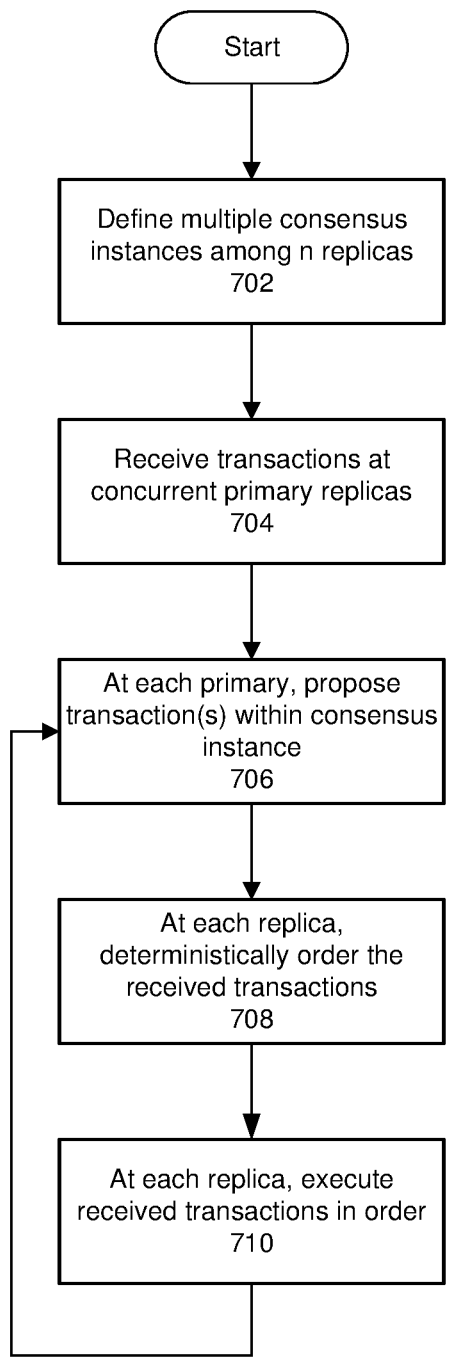
FIG. 7 is a flow chart illustrating operation of resilient concurrent consensus among a cluster (or shard) of replicas, in accordance with some embodiments.

FIG. 7 is a flow chart illustrating operation of resilient concurrent consensus among a cluster (or shard) of replicas, according to some embodiments. In one or more embodiments, one or more of the operations may be omitted, repeated, and/or performed in a different order. Accordingly, the specific arrangement of steps shown in FIG. 7 should not be construed as limiting the scope of the embodiments.

In operation 702, multiple consensus instances are defined or established among n replicas of a given set of unique data (e.g., within one shard of a sharded data management system), with each consensus instance corresponding to an instance of a Byzantine commit algorithm protocol operating at each participating replica. In some implementations the number m of concurrent consensus instances equals n, but in other implementations 1<m≤n.

In operation 704, transactions are received at concurrent primary replicas (i.e., the replicas acting as primary replicas for each of the m consensus instances) from clients and/or other entities. For example, a transaction coordinator or client coordinator entity may receive transactions initiated by clients and distribute them to responsible replicas such as the concurrent primaries. Transactions may be continuously received at the concurrent primaries throughout the illustrated method.

In operation 706, each concurrent primary proposes one or more transactions within its instance by broadcasting them to all other replicas. This may be considered the proposal phase of operation that coincides with a new round of concurrent consensus.

In order to improve transaction throughput, each concurrent primary continuously proposes new transactions, or sets of transactions, to the extent possible while fulfilling other phases of operation within its consensus instance and other instances (e.g., while ordering and executing transactions within all active consensus instances).

In operation 708, other replicas receive the proposed transactions (and transactions proposed by other concurrent primaries) and deterministically order them, so that all proposed transactions in each instance are ordered identically. Various criteria may be used to facilitate the ordering, such as unique replica identifiers of the concurrent primaries that proposed the transactions, unique serial numbers or other transaction identifiers assigned by the primaries, timestamps affixed to the transactions, etc.

As part of operation 708, the replicas also perform their local consensus protocol (e.g., BCA) to ensure that a majority of replicas agree on the validity of the proposed transactions. For example, if PBFT is employed as a BCA, preprepare, prepare, and commit stages may be conducted at each replica. One or more transactions or sets of transactions may be aborted during this process.

In operation 710, ordered transactions that have achieved consensus are executed at the replicas in their assigned order, and corresponding clients (or other transaction originators) are notified. After operation 710, the current round of operation of concurrent consensus ends and the method also ends, or the method returns to operation 706 to commence a new round.

In some embodiments of resilient concurrent consensus, one or more additional consensus instances are maintained to help recover from failures. These may include a global independent 'recovery' consensus instance or a per-instance independent recovery instance. A recovery consensus instance has an associated primary replica, which may also act as a concurrent primary in a regular (non-recovery) consensus instance.

Failure to receive proposed transactions in a given consensus instance $I_i$ (other than the recovery instance) during a round may be assumed to indicate that the corresponding primary is faulty or malicious. For example, if one or more non-faulty replicas receive transactions within other consensus instances, but not $I_i$, those replicas may assume that there is a problem with the concurrent primary.

Recovery from a discovered failure of a primary may involve, first, detection of the failure by all non-faulty replicas within the affected consensus instance. Second, the non-faulty replicas use the independent recovery consensus instance to come to a consensus regarding the state of $I_i$. The state of a consensus instance comprises those transactions that have been proposed and executed prior to the beginning of the current round of operation, and extending back in time a predetermined number of rounds or period of time. Third, the non-faulty replicas agree when the concurrent primary (which may be replaced by a different replica) can resume operations.

More specifically, in some embodiments, when a non-faulty replica detects a problem with a concurrent primary in one of the consensus instances (e.g., $I_i$), it broadcasts a FAILURE message within the recovery consensus instance. The message identifies the affected consensus instance $I_i$, the current round of operation, and the currently perceived state of $I_i$. The replica may continue to broadcast this message until the failure is resolved (e.g., with exponentially increasing delays between transmissions). In some implementations this full FAILURE message may be sent only to the primary of the recovery instance, while an abbreviated version of the message that omits the current state information may be sent to other replicas.

When a given replica receives FAILURE messages regarding $I_i$ from more than ⅔ of all replicas, it must have received at least one from a non-faulty replica and may therefore assume that the corresponding primary is faulty. The given replica then waits on the primary of the recovery consensus instance to issue a STOP order, and/or the expiration of an 'instance failure' timer that it started upon determining that the primary of $I_i$ is faulty. The primary for the recovery instance must send the STOP order and initiate a procedure to obtain consensus on the state of $I_i$, before the instance failure timer expires, or it will be subjected to a view change in which it is replaced.

After the replicas receive the STOP order from the primary replica of the recovery consensus instance, they agree upon the state of the failed consensus instance. For example, the primary of the recovery instance may broadcast the state after obtaining the replicas' consensus or by adopting a particular view of the state.

The failed consensus instance may be restarted after some period (e.g., some number of rounds), as specified by the primary of the recovery consensus instance, for example. It may be restarted with the same primary, because the problem may have been faulty communications and not a malicious primary, or with a different primary. However, if there are no replicas, other than the failed primary, that are not currently acting as primaries for a non-recovery consensus instance, and if the failed instance has been restarted multiple times and the same primary failed each time, the failed instance may remain quiescent. In some embodiments, when a failed instance is restarted multiple times, the period of time or number of rounds that must pass before the restart may increase with each restart, possibly exponentially.

Use of the recovery consensus instance to recover a failed consensus instance occurs in parallel with operation of other consensus instances. In other words, consensus instances that have not failed may continue to process transactions without interruption.

Coordinated action by malicious replicas can undermine the execution of resilient concurrent consensus in some environments. For example, when multiple replicas are malicious and each is a concurrent primary, they could impede progress by selectively preventing some non-faulty replicas from receiving transactions. Therefore, in some embodiments, checkpointing is performed to ensure correctness, on an as-needed basis.

For example, when a given replica receives FAILURE messages for an instance $I_i$ from more than ⅓ of all replicas for a given round, and the replica has finished that round for instance $I_i$ (or for all instances), it will participate in a checkpoint for the given round by exchanging its state for $I_i$ with the other replicas.

In some embodiments described in this document, every client that submits transactions to the system may be assigned to a single primary replica or to the primary responsible for a particular consensus instance $I_j$. In these embodiments, the client submits transactions only to the assigned primary and only that primary can propose transactions initiated by that client. If the assigned primary fails, it will eventually be replaced or restarted as described previously (e.g., via a view change or recovery operation).

In addition, a client may proactively request reassignment by submitting a SWITCHINSTANCE request to all replicas. The recovery consensus instance may then be used by the replicas to obtain consensus regarding the consensus instance (and concurrent primary) to which the client should be reassigned (e.g., the least busy instance or primary).

In periods of low activity, a given primary replica may not receive or propose any transactions for a given round of concurrent consensus. In such cases the primary may propose a dummy transaction or send a no-op request to inform the replicas participating in its consensus instance that the primary is still operating (i.e., that it has not failed).

A malicious primary that refuses to propose transactions from a particular client will be discovered when the client, after failing to receive confirmations of transaction completion, submits a transaction (or set of transactions) to some or all other replicas within the cluster or shard of replicas that include the client's assigned primary. Those replicas will forward the transaction to the assigned primary. If the primary still does not propose the transaction (e.g., within a predetermined time period), the replicas will treat the primary has having failed and will initiate recovery and a different primary replica will be assigned to the client.

An environment in which one or more embodiments described above are executed may incorporate a general-purpose computer or a special-purpose device such as a hand-held computer or communication device. Some details of such devices (e.g., processor, memory, data storage, display) may be omitted for the sake of clarity. A component such as a processor or memory to which one or more tasks or functions are attributed may be a general component temporarily configured to perform the specified task or function, or may be a specific component manufactured to perform the task or function. The term "processor" as used herein refers to one or more electronic circuits, devices, chips, processing cores and/or other components configured to process data and/or computer program code.

Data structures and program code described in this detailed description are typically stored on a non-transitory computer-readable storage medium, which may be any device or medium that can store code and/or data for use by a computer system. Non-transitory computer-readable storage media include, but are not limited to, volatile memory; non-volatile memory; electrical, magnetic, and optical storage devices such as disk drives, magnetic tape, CDs (compact discs) and DVDs (digital versatile discs or digital video discs), solid-state drives, and/or other non-transitory computer-readable media now known or later developed.

Methods and processes described in the detailed description can be embodied as code and/or data, which may be stored in a non-transitory computer-readable storage medium as described above. When a processor or computer system reads and executes the code and manipulates the data stored on the medium, the processor or computer system performs the methods and processes embodied as code and data structures and stored within the medium.

Furthermore, the methods and processes may be programmed into hardware modules such as, but not limited to, application-specific integrated circuit (ASIC) chips, field-programmable gate arrays (FPGAs), and other programmable-logic devices now known or hereafter developed. When such a hardware module is activated, it performs the methods and processes included within the module.

The foregoing embodiments have been presented for purposes of illustration and description only. They are not intended to be exhaustive or to limit this disclosure to the forms disclosed. Accordingly, many modifications and variations will be apparent to practitioners skilled in the art. The scope is defined by the appended claims, not the preceding disclosure.

Clauses describing some embodiments follow:

A1. In some embodiments achieving consensus among multiple replicas of a set of data comprises during each of multiple rounds, at each of the multiple replicas: proposing a set of transactions to all other replicas; deterministically ordering the proposed set of transactions and sets of transactions proposed by other replicas during the present round; determining whether to execute the ordered sets of transactions based on consensus among the multiple replicas; and executing, in said deterministic order, sets of transactions for which consensus is achieved among the multiple replicas.

A2. The method of Clause A1, further comprising: defining multiple consensus instances, wherein each consensus instance is associated with one of the multiple replicas; and wherein each of the multiple replicas proposes the set of transactions within its associated consensus instance.

A3. The method of Clause A2, wherein deterministically ordering the proposed set of transactions and sets of transactions proposed by other replicas comprises: ordering all proposed transactions according to criteria that include identifiers of the consensus instances in which the transactions were proposed.

A4. The method of Clause A3, wherein determining whether to execute the ordered sets of transactions based on consensus among the multiple replicas comprises: within each consensus instance, replicating the set of transactions proposed by the associated replica by broadcasting the set of transactions to one or more replicas; and comparing the proposed set of transactions with copies of the set of transactions received via broadcast from the one or more replicas.

A5. The method of Clause A2, further comprising: defining a recovery consensus instance for exchanging error messages among the multiple replicas; wherein each of the multiple replicas that detects an error within a consensus instance other than the recovery consensus instance broadcasts a specified message within the recovery consensus instance.

A6. The method of Clause A5, further comprising: detecting within a first consensus instance a failure of a first replica associated with the first consensus instance; causing the first consensus instance to pause operation by broadcasting a FAILURE message in the recovery consensus instance; facilitating agreement on a state of the first consensus instance prior to the failure; and facilitating recovery of the first consensus instance.

A7. The method of Clause A2, further comprising: periodically associating one or more of the multiple replicas with different consensus instances.

What is claimed is:

1. A method, comprising:
   receiving a transaction at a given node of a given shard of a sharded data management system comprising a set S of shards, $|S|>1$, wherein:
   each shard in S comprises a cluster of nodes among which a corresponding set of data unique to the shard is replicated;

shards in S are logically ring-ordered by unique shard identifiers; and the transaction involves a set T of shards, wherein T⊆S and |T|>1;

wherein the transaction requires data to be read from and/or written to the set of data corresponding to each shard in T;

at each shard in T, in said ring order:
  obtaining consensus among the nodes of the shard to commit the transaction;
  locking data identified in a read-write set for the shard; and
  at each of multiple nodes of the shard, forwarding the transaction to a corresponding node of a next shard in T in said ring order; and after all shards in T have obtained consensus to commit the transaction, for each shard in T in said ring order:
  executing the read-write set for the shard if not already executed;
  releasing locked data, if any; and
  notifying the next shard in T.

2. The method of claim 1, wherein:
if the given shard is not the first ordered shard in T, the given node of the given shard redirects the transaction to a node of the first ordered shard in T.

3. The method of claim 1, wherein the transaction:
is received from a client;
identifies each of the T shards; and
specifies the read-write sets for the T shards.

4. The method of claim 1, wherein obtaining consensus among the nodes of a shard to commit the transaction comprises, at each of a plurality of the nodes:
broadcasting a first message within the shard;
upon receipt of at least a threshold number of first messages from other nodes of the shard, broadcasting a second message within the shard; and
upon receipt of at least the threshold number of second messages from other nodes of the shard, committing the transaction.

5. The method of claim 1, wherein:
all nodes in every shard have sequential identifiers unique within that shard; and
corresponding nodes in different shards have the same identifier.

6. The method of claim 5, wherein forwarding the transaction to a corresponding node of a next shard in T comprises:
reporting the transaction to the corresponding node of the next shard in said ring order, with confirmation that a threshold number of nodes of the shard committed the transaction.

7. The method of claim 6, wherein said confirmation comprises digital signatures of multiple nodes that committed the transaction within the shard.

8. The method of claim 6, further comprising at each of a plurality of nodes of the next shard:
receiving the transaction from the corresponding node of the shard; and
broadcasting receipt of the transaction within the next shard to promote obtention of consensus to commit the transaction.

9. The method of claim 1, further comprising:
at each of one or more nodes of one or more shards in T, maintaining set of timers associated with the transaction, including:

a transmit timer that, upon expiration, causes the node to re-forward the transaction to the corresponding node of the next shard; and a remote timer that, upon expiration, causes the node to transmit an alert to the corresponding node of a previous shard.

10. The method of claim 9, wherein:
the transmit timer is set and begins timing when the node forwards the transaction to the corresponding node of the next shard; and
the remote timer is set and begins timing when the node receives the transaction from the corresponding node of the previous shard.

11. The method of claim 1, further comprising at each node in a first cluster of nodes of a first shard:
proposing a set of transactions to all other nodes in the first cluster;
deterministically ordering the proposed set of transactions and sets of transactions proposed by the other nodes;
determining whether to execute the ordered sets of transactions based on consensus among the first cluster of nodes; and
executing, in said deterministic order, sets of transactions for which consensus was achieved among the first cluster of nodes.

12. A non-transitory computer-readable medium storing instructions that, when executed by a processor, cause the processor to perform a method comprising:
receiving a first transaction at a given node of a given shard of a sharded data management system comprising a set S of shards, |S|>1, wherein:
  each shard in S comprises a cluster of nodes among which a corresponding set of data unique to the shard is replicated;
  shards in S are logically ring-ordered by unique shard identifiers; and
  the transaction involves a set T of shards, wherein T⊆S and |T|>1;
  wherein the transaction requires data to be read from and/or written to the set of data corresponding to each shard in T;
at each shard in T, in said ring order:
  obtaining consensus among the nodes of the shard to commit the transaction;
  locking data identified in a read-write set for the shard; and
  at each of multiple nodes of the shard, forwarding the transaction to a corresponding node of a next shard in T in said ring order; and
after all shards in T have obtained consensus to commit the transaction, for each shard in T in said ring order:
  executing the read-write set for the shard if not already executed;
  releasing locked data, if any; and
  notifying the next shard in T.

13. The non-transitory computer-readable medium of claim 12, wherein:
all nodes in every shard have sequential identifiers unique within that shard;
corresponding nodes in different shards have the same identifier; and
reporting the transaction to the corresponding node of the next shard in said ring order, with confirmation that a threshold number of nodes of the shard committed the transaction.

14. The non-transitory computer-readable medium of claim 13, wherein said confirmation comprises digital signatures of multiple nodes that committed the transaction within the shard.

15. The non-transitory computer-readable medium of claim 12, wherein the method further comprises:
at each of one or more nodes of one or more shards in T, maintaining set of timers associated with the transaction, including:
a transmit timer that, upon expiration, causes the node to re-forward the transaction to the corresponding node of the next shard; and
a remote timer that, upon expiration, causes the node to transmit an alert to the corresponding node of a previous shard.

16. A resilient sharded data management system, comprising:
multiple shards, each shard comprising a corresponding cluster of nodes among which a set of data unique to the shard is replicated among the nodes;
wherein each node of each shard comprises at least one processor and memory storing instructions that, when executed by the at least one processor, cause the node to:
receive a first transaction at a given node of a given shard of a sharded data management system comprising a set S of shards, |S|>1, wherein:
each shard in S comprises a cluster of nodes among which a corresponding set of data unique to the shard is replicated;
shards in S are logically ring-ordered by unique shard identifiers; and
the transaction involves a set T of shards, wherein T⊆S and |T|>1;
wherein the transaction requires data to be read from and/or written to the set of data corresponding to each shard in T;
at each shard in T, in said ring order:
obtain consensus among the nodes of the shard to commit the transaction;
lock data identified in a read-write set for the shard; and
at each of multiple nodes of the shard, forward the transaction to a corresponding node of a next shard in T in said ring order; and
after all shards in T have obtained consensus to commit the transaction, for each shard in T in said ring order:
execute the read-write set for the shard if not already executed;
release locked data, if any; and
notify the next shard in T.

17. The resilient sharded data management system of claim 16, wherein:
all nodes in every shard have sequential identifiers unique within that shard;
corresponding nodes in different shards have the same identifier; and
reporting the transaction to the corresponding node of the next shard in said ring order, with confirmation that a threshold number of nodes of the shard committed the transaction.

18. The resilient sharded data management system of claim 17, wherein said confirmation comprises digital signatures of multiple nodes that committed the transaction within the shard.

19. The resilient sharded data management system of claim 17, wherein the memory of each node of each shard further stores instructions that, when executed by the at least one processor, cause the node to:
receive the transaction from the corresponding node of the shard; and
broadcast receipt of the transaction within the next shard to promote obtention of consensus to commit the transaction.

20. The resilient sharded data management system of claim 16, wherein the memory of each node of each shard further stores instructions that, when executed by the at least one processor, cause the node to:
maintain set of timers associated with the transaction, including:
a transmit timer that, upon expiration, causes the node to re-forward the transaction to the corresponding node of the next shard; and
a remote timer that, upon expiration, causes the node to transmit an alert to the corresponding node of a previous shard.

21. The resilient sharded data management system of claim 20, wherein:
the transmit timer is set and begins timing when the node forwards the transaction to the corresponding node of the next shard; and
the remote timer is set and begins timing when the node receives the transaction from the corresponding node of the previous shard.

* * * * *